(12) United States Patent
Yang et al.

(10) Patent No.: US 7,793,130 B2
(45) Date of Patent: Sep. 7, 2010

(54) MOTHER/DAUGHTER SWITCH DESIGN WITH SELF POWER-UP CONTROL

(75) Inventors: Shih-Hsien Yang, Hsinchu (TW); Chung-Hsing Wang, Baoshan Township (TW); Lee-Chung Lu, Taipei (TW); Chun-Hui Tai, Hsin-Chu (TW); Cliff Hou, Taipei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 691 days.

(21) Appl. No.: 11/789,721

(22) Filed: Apr. 24, 2007

(65) Prior Publication Data

US 2008/0270813 A1 Oct. 30, 2008

(51) Int. Cl.
*G06F 1/26* (2006.01)
(52) U.S. Cl. ............... 713/323; 713/300; 713/310; 713/340
(58) Field of Classification Search ............ 713/300, 713/323
See application file for complete search history.

(56) References Cited

U.S. PATENT DOCUMENTS

| 6,946,901 | B2 * | 9/2005 | Kang et al. | 327/544 |
| 7,142,019 | B2 * | 11/2006 | Mair et al. | 326/96 |
| 7,570,100 | B2 * | 8/2009 | Dong et al. | 327/427 |
| 2008/0059824 | A1 * | 3/2008 | Rowhani et al. | 713/324 |

OTHER PUBLICATIONS

Hattori, T., et al., "Hierarchical Power Distribution and Power Management Scheme for a Single Chip Mobile Processor," DAC 2006, Jul. 2006, pp. 292-295, ACM, San Francisco, CA.

Kanno, Y., et al., "Hierarchical Power Distribution with 20 Power Domains in 90-nm Low-Power Multi-CPU Processor," ISSCC 2006: 2006 IEEE International Solid-State Circuits Conference, Session 29, 2006, pp. 540-541, 671, IEEE, Los Alamitos, CA.

Royannez, P., et al., "90nm Low Leakage SoC Design Techniques for Wireless Applications," ISSCC 2005: 2005 IEEE International Solid-State Circuits Conference, Session 7, 2005, pp. 138-139, 589, IEEE, Los Alamitos, CA.

Shi, K., et al., "Sleep Transistor Design and Implementation—Simple Concepts Yet Challenges to be Optimum," 2006 International Symposium on VLSI Design, Automation and Test (VLSI-DAT), Apr. 2006, 4 pp., Industrial Technology Research Institute of Taiwan, Hsinchu, Taiwan.

* cited by examiner

*Primary Examiner*—Nitin C Patel
(74) *Attorney, Agent, or Firm*—Slater & Matsil, L.L.P.

(57) ABSTRACT

System and method for providing power to integrated circuitry with good power-on responsive time and reduced power-on transient glitches. A preferred embodiment comprises a daughter switch coupled to a circuit block, a first control circuit coupled to the daughter circuit, a second control circuit coupled to the first control circuit, and a mother circuit coupled to the circuit block and to the second control circuit. After the daughter switch is turned on by a control signal, the mother switch is not turned on until the daughter switch has discharged (charged) the voltage potential across power rails of the mother circuit to a point where glitches are minimized. The second control circuit turns on the mother circuit when the reduced voltage potential is reached, with a signal produced by the first control circuit reflects the voltage potential. Furthermore, a bypass circuit can be used to reduce leakage current.

20 Claims, 6 Drawing Sheets

MOTHER/DAUGHTER SWITCH DESIGN WITH SELF POWER-UP CONTROL

TECHNICAL FIELD

The present invention relates generally to a system and a method for integrated circuits, and more particularly to a system and a method for providing power to integrated circuitry with good power-on response time and reduced power-on transient glitches.

BACKGROUND

There is a continued push by manufacturers of electronics to increase functionality of electronic devices. Greater functionality in an electronic device can provide additional processing power within the same package or increased convenience by reducing the total number of electronic devices. For example, rather than carrying a cellular telephone, a pager, and a personal digital assistant (PDA), a user can carry a single electronic device that has the combined functionality of the cellular telephone, the pager, and the PDA.

Increasing the functionality of an electronic device can require the integration of additional electronics into the electronic device. Without a concurrent change in process technology that can help reduce power consumption, an integrated circuit with an increased number of devices will tend to consume more power than an integrated circuit with fewer devices. Therefore, given a fixed battery capacity, a battery powered electronic device with increased functionality will require more frequent charging of the battery or a battery with greater capacity.

A technique that can help to reduce the power consumption of an integrated circuit is to design the integrated circuit with multiple power domains, with each power domain containing a subset of the overall functionality provided by the integrated circuit. For example, a first power domain can contain two unique functions, a second power domain can contain a single unique function, and so forth. Then, when the functions of the integrated circuit within a power domain are not being used, the power being provided to the circuitry within the power domain can be eliminated. Since no power is provided to the circuitry, the circuitry consumes no power. Alternatively, the circuitry within a power domain that performs the functions can be placed into a sleep or hibernate mode. When in the sleep mode, the circuitry can consume a very small amount of power. It may be possible to reduce power consumption in sleeping circuitry to substantially zero.

Figure 1A:
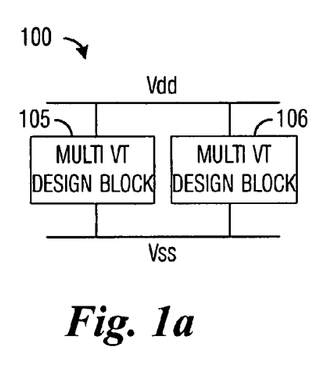
FIGS. 1a through 1c are diagrams of an integrated circuit with circuitry partitioned into multiple multi-voltage threshold design blocks and alternate switch configurations for controlling current flow.

A diagram shown in FIG. 1a illustrates an integrated circuit 100. The integrated circuit 100 contains circuitry that has been partitioned into multiple multi-voltage threshold design blocks, such as multi-voltage threshold design blocks 105 and 106. The multi-voltage threshold design blocks 105 and 106 are independently coupled to power rails Vdd and Vss. The coupling of the multi-voltage threshold design blocks 105 and 106 to the power rails Vdd and Vss can enable the decoupling of one or both of the design blocks 105 and 106 from the power rails without affecting the power delivery to other design blocks in the integrated circuit 100.

Figure 1B:
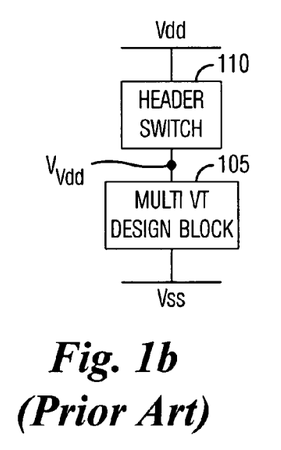
Figure 1C:
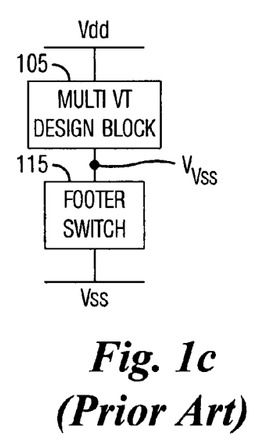

To decouple a multi-voltage threshold design block from the power rails, it is necessary to sever the current path through the multi-voltage threshold design block. Diagrams shown in FIGS. 1b and 1c illustrate two prior art techniques for severing the current path through the multi-voltage threshold design block 105. Both prior art techniques use a switch that is serially connected between the multi-voltage threshold design block 105 and one of the two power rails. When the switch is open, the current path between the multi-voltage threshold design block 105 and the two power rails is interrupted and power to the multi-voltage threshold design block 105 is cut-off. When the switch is closed, the current path between the multi-voltage threshold design block 105 and the two power rails is established, permitting current flow through the multi-voltage threshold design block 105.

The diagram shown in FIG. 1b illustrates the use of a switch 110 serially connected between the Vdd power rail and the multi-voltage threshold design block 105. Since the switch 110 is at the head of the multi-voltage threshold design block 105, it is commonly referred to as being a header switch. An electrical node between the header switch 110 and the multi-voltage threshold design block 105 can be referred to as a virtual Vdd or $V_{Vdd}$. The diagram shown is FIG. 1c illustrates the use of a switch 115 serially connected between the multi-voltage threshold design block 105 and the Vss power rail. Since the switch 115 is at the foot of the multi-voltage threshold design block 105, it is commonly referred to as being a footer switch. An electrical node between the header switch 110 and the design block 105 can be referred to as a virtual Vss or $V_{Vss}$.

Since the header switch 110 and the footer switch 115 are typically implemented as one or more MOS transistors, there is a voltage drop across the header switch 110 and the footer switch 115. Therefore, the voltage at $V_{Vdd}$ or $V_{Vss}$ is not exactly equal to the voltage at the Vdd power rail or the Vss power rail.

One disadvantage of the prior art technique of using a switch (either a header switch or a footer switch) to control the current path through a multi-voltage threshold design block is the sizing of the switch. If the switch is large, to meet performance requirements, for example, then turning on the switch can cause a significant glitch. On the other hand, if the switch is small, to meet electron migration requirements, for example, then the switch may not be able to provide adequate current to the multi-voltage threshold design block within timing requirements.

SUMMARY OF THE INVENTION

These and other problems are generally solved or circumvented, and technical advantages are generally achieved, by preferred embodiments of the present invention which provides a system and a method providing power to integrated circuitry with good power-on response time and reduced power-on transient glitches.

In accordance with a preferred embodiment of the present invention, an integrated circuit is provided. The integrated circuit includes a daughter circuit coupled to a circuit block, a first control circuit coupled to the daughter circuit, a second control circuit coupled to the first control circuit, and a mother circuit coupled to the circuit block and to the second control circuit. The daughter circuit couples the circuit block to a power rail in response to a control signal, the first control circuit produces a signal at a specified voltage level responsive to the control signal, and the second control circuit detects when the signal produced by the first control circuit reaches a specified threshold and produces a turn on signal. The mother circuit couples the circuit block to the power rail responsive to the turn on signal.

In accordance with another preferred embodiment of the present invention, a method for power-up control of a functional circuit is provided. The method includes turning on a first circuit in response to a receiving of a power-up signal, wherein the first circuit regulates a first current flow to the functional circuit, and turning on a second circuit in response to a detecting of a voltage potential based on a signal line produced by a voltage generation circuit is about equal to a turn on point for the second circuit, wherein the second circuit regulates a second current flow to the functional circuit. The method also includes turning on a bypass circuit in response to a detecting that a voltage potential based on the signal line produced by the voltage generation circuit is about equal to a turn on point for the bypass circuit.

In accordance with another preferred embodiment of the present invention, an integrated circuit comprising one or more power domains is provided. The integrated circuit includes one or more circuit blocks, with each circuit block coupled to a first power rail, each circuit block performs a specified function, a power-up control circuit for each circuit block, the power-up control circuit coupled between the circuit block and a second power rail, the power-up control circuit regulates current flowing between the first power rail and the second power rail through the power-up control circuit and a respective circuit block, the power-up control circuit includes a daughter circuit coupled to a respective circuit block, a first control circuit coupled to the daughter circuit, a second control circuit coupled to the first control circuit, and a mother circuit coupled to the respective circuit block and to the second control circuit. The daughter circuit detects a specified value on a control signal line and couples the respective circuit block to the second power rail when the specified value is detected on the control signal line, the first control circuit produces a signal at a specified voltage level responsive to a control signal on the control signal line, the second control circuit detects when the signal produced by the first control circuit reaches a specified threshold and produces a turn on signal, and the mother circuit couples the respective circuit block to the second power rail responsive to the turn on signal.

An advantage of a preferred embodiment of the present invention is the use of a dual switch design can allow for the optimization of the turn-on performance. For example, a small first switch (a daughter switch) can be used to meet electron migration performance requirements and a large second switch (a mother switch) can be used to meet performance requirements. The daughter switch can be turned on first to reduce a voltage difference across the switches and then the mother switch can be turned on to provide needed current. Since the voltage difference across the switches has been reduced, the magnitude of a resulting glitch is also reduced.

Yet another advantage of a preferred embodiment of the present invention is the reduced glitch that can occur when the mother switch is turned on. The reduction of the magnitude of the glitch can allow for the simultaneous turning on of multiple multi-voltage threshold design blocks. This can reduce the turn-on time of the multi-voltage threshold design blocks and improve the overall performance of the integrated circuit.

A further advantage of a preferred embodiment of the present invention is the self-monitored turn on of the mother switch. The mother switch can be automatically turned on, thereby minimizing a delay between the initiation of the turn-on of the multi-voltage threshold design block and the providing of the required current to the design block, which may occur if the turn on of the mother switch was base solely on a time delay.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely static random access memory (SRAM) ICs. The invention may also be applied, however, to other integrated circuits manufactured using complementary metal oxide semiconductor (CMOS) technologies and functional circuits of various types, such as processor ICs, controller ICs, application specific ICs, other types of memory ICs, and so forth. The present invention can be used where there is a desire to reduce power consumption by integrated circuits and/or rapidly awaken circuitry that has had power removed or placed in a sleep mode.

Figure 2:
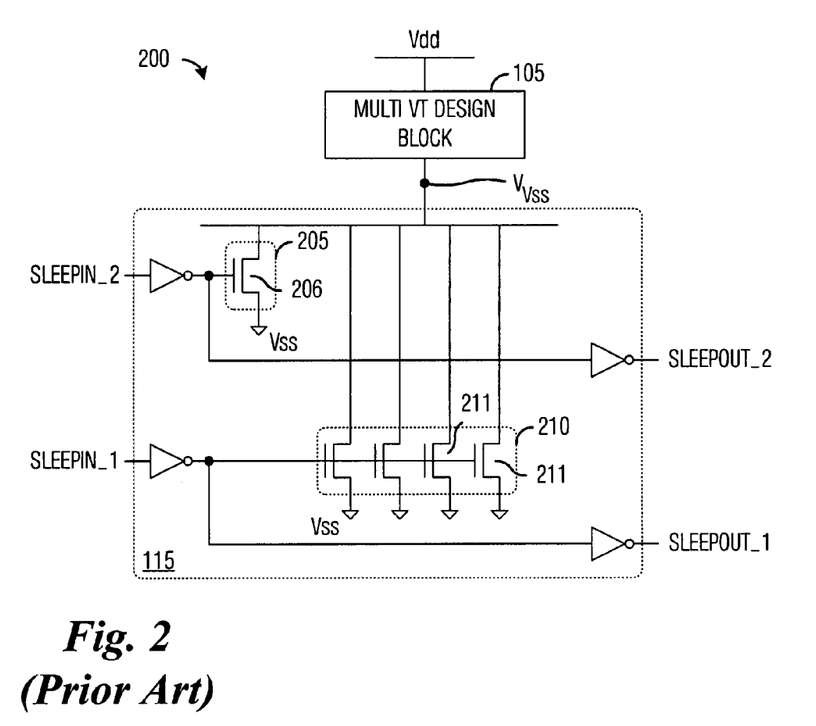
FIG. 2 is a diagram of a portion of an integrated circuit with a prior art power-up control circuit.

With reference now to FIG. 2, there is shown a diagram illustrating a high-level view of portion of an integrated circuit 200, wherein the integrated circuit 200 makes use of a prior art technique of using footer switches to cut-off current paths through portions of the integrated circuit 200. The integrated circuit 200 may be a memory chip, such as an SRAM IC, for example. The diagram shown in FIG. 2 illustrates a single power domain of the integrated circuit 200, wherein a footer switch 115 is used to sever a current path between power rails Vdd and Vss through a multi-voltage threshold design block 105. Although shown in FIG. 2 as containing a single multi-voltage threshold design block, a power domain can contain multiple multi-voltage threshold design blocks. The footer switch 115 includes a daughter switch 205 (shown implemented as an N-type MOS transistor 206) and a mother switch 210 (shown implemented as multiple N-type MOS transistors 211). The actual number of transistors used to implement the daughter switch 205 and the mother switch 210 can depend on factors such as performance requirements, electron migration requirements, fabrication process capabilities and limitations, design routing and placement restrictions and requirements, and so forth.

The state of the daughter switch 205 can be controlled by a first sleep control signal (SLEEPIN_2) provided on a first sleep control signal line. As shown in FIG. 2, the first sleep control signal is an active low signal and when a logic low value is placed on the first sleep control signal line, the daughter switch 205 is closed, creating a current path between power rails Vdd and Vss through the multi-voltage threshold design block 105. The first sleep control signal is also outputted to permit the daisy-chaining daughter switches control for the same multi-voltage threshold design block or more than one multi-voltage threshold design blocks within the same power domain.

The state of the mother switch 210 can be controlled by a second sleep control signal (SLEEPIN_1) provided on a second sleep control signal line. As with the first sleep control signal, the second sleep control signal is an active low signal and when a logic low value is placed on the second sleep control signal line, the mother switch 210 (the multiple transistors 211) is closed and an additional current path between power rails Vdd and Vss through the multi-voltage threshold design block 105 is created. Since there are multiple transistors in the mother switch 210, greater current can flow through the mother switch 210 (assuming that the transistors 211 are not sized so that their combination is smaller than the transistor 206). The second sleep control signal is also outputted to permit the daisy-chaining mother switches control for the same multi-voltage threshold design block or more than one multi-voltage threshold design blocks within the same power domain.

A typical power-on sequence for a power domain that has been turned off can include turning on the daughter switch 205 by providing a properly valued SLEEPIN_2 signal on the first sleep control signal. If a large or more than one multi-voltage threshold design blocks are to be turned on, the SLEEPIN_2 signal propagates through the remaining daughter switches control signals, turning on the daughter switches in the respective footer switches. The SLEEPOUT_2 signal of a final switch cell (including 205 and 210) in the power domain can then be connected to a second sleep control signal of the final switch cell, becoming the SLEEPIN_1 signal and turning on the mother switches for the multi-voltage threshold design block. The SLEEPIN_1 signal propagates through the remaining mother switches control signals, turning on the mother switches in the respective footer switches.

A disadvantage of the power-on sequence described above is the unpredictability of the turn-on of the mother switches. The delay from the turn-on of a multi-voltage threshold design block's daughter switch and its mother switch can depend upon the number of multi-voltage threshold design blocks in the power down and the multi-voltage threshold design block position in the daisy chain.

Another disadvantage of the power-on sequence is that since the turn-on of the mother switch is unpredictable, it is possible to create glitches when the mother switches are turned on, which can cause damage to circuitry in the multi-voltage threshold design blocks.

Yet another disadvantage of the power-on sequence is that multiple sleep control signals are required for each footer switch. The presence of additional sleep control signal lines can complicate design and routing of the integrated circuit.

Figure 3A:
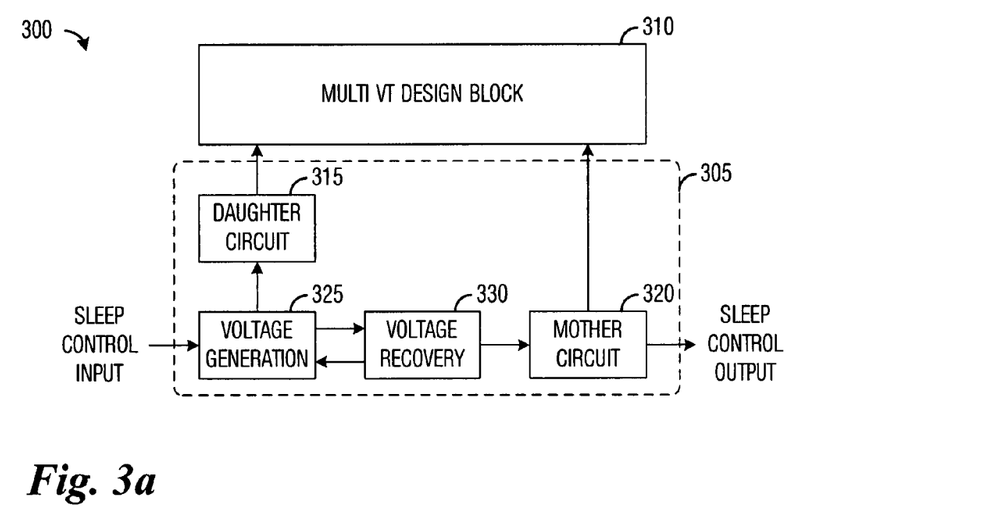
FIGS. 3a through 3c are diagrams of portions of integrated circuits with power-up control circuits in multiple configurations, according to a preferred embodiment of the present invention.
Figure 3B:
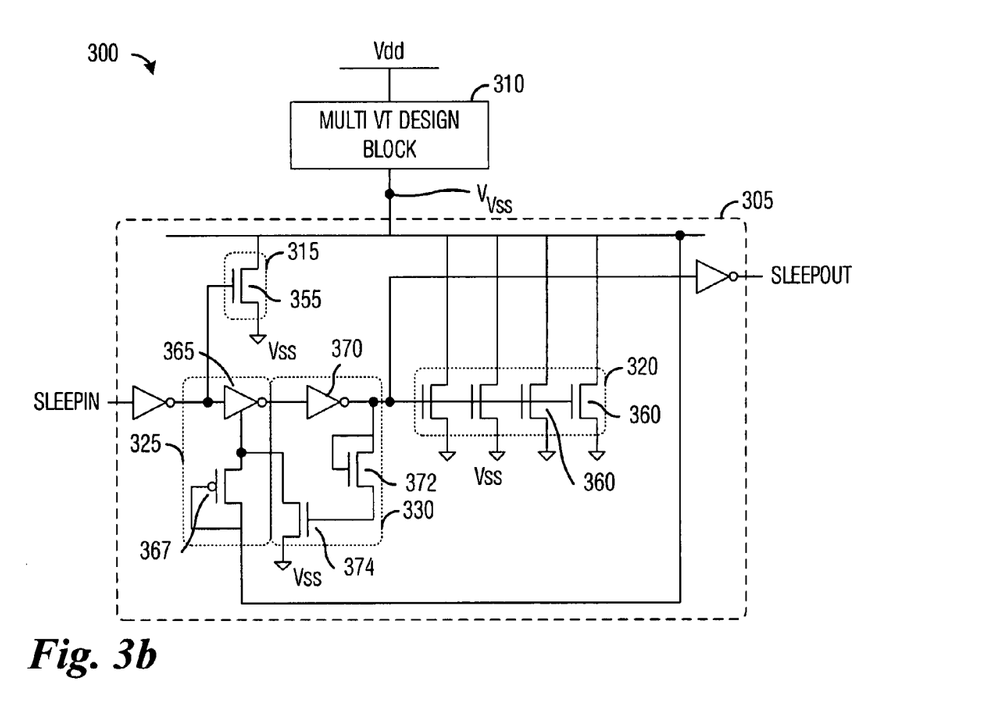
Figure 3C:
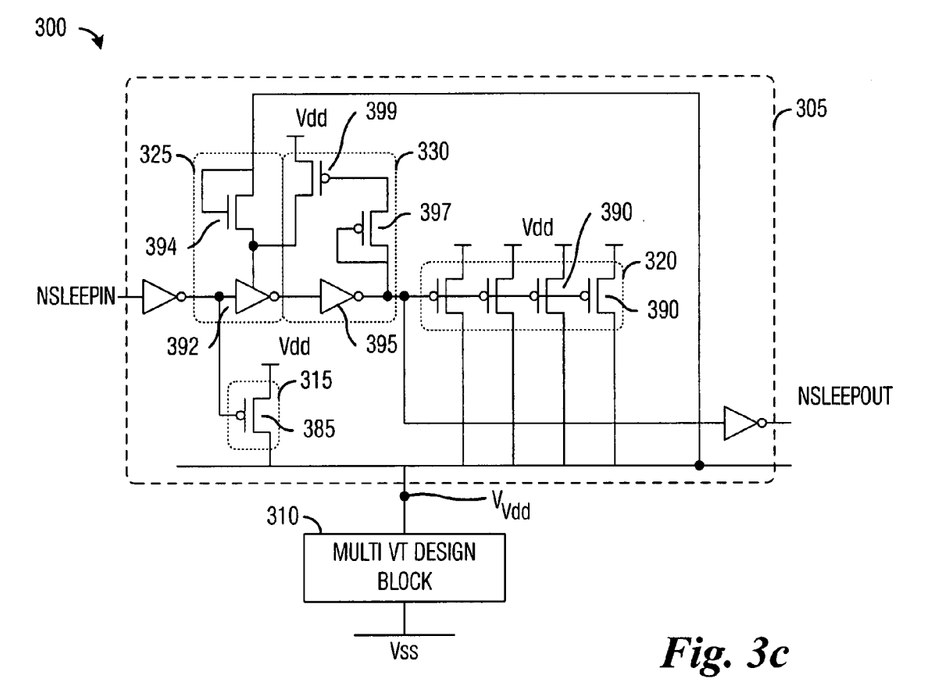

With reference now to FIGS. 3a through 3c, there is shown a diagram illustrating a high-level view of a portion of an integrated circuit 300, wherein a power-up control circuit 305 is utilized to control the providing of power to a multi-voltage threshold design block 310, and detailed views of exemplary power-up control circuits, according to a preferred embodiment of the present invention. As shown in FIG. 3a, the power-up control circuit 305 can be serially coupled to the multi-voltage threshold design block 310 either between the Vdd power rail and the multi-voltage threshold design block 310 (referred to as being a header configuration) or the multi-voltage threshold design block 310 and the Vss power rail (referred to as being a footer configuration), for example. The power-up control circuit 305 can control the state of a current path between the two power rails through the multi-voltage threshold design block 310, i.e., the power-up control circuit 305 can turn-on and turn-off current flow through the multi-voltage threshold design block 310. The multi-voltage threshold design block 310 may contain memory cells, such as SRAM memory cells. For example, the multi-voltage threshold design block 310 may contain a portion of a total number of SRAM memory cells in the integrated circuit 300 and other multi-voltage threshold design blocks may contain the remaining SRAM memory cells. Alternatively, the multi-voltage threshold design block 310 may contain functional unit(s) for an integrated circuit.

According to a preferred embodiment of the present invention, the power-up control circuit 305 can include a daughter circuit 315 that can provide a coupling between the multi-voltage threshold design block 310 and a power rail (either Vdd or Vss depending on configuration) and a mother circuit 320 that can also provide a coupling between the multi-voltage threshold design block 310 and the power rail. For example, the mother circuit 320 can be used to provide a large current flow through the multi-voltage threshold design block 310, while the daughter circuit 315 can provide a quick current flow response. Although the diagram shown in FIG. 3a displays a single daughter circuit 315 and a single mother circuit 320, a plurality of daughter circuits and/or mother circuits can be used in a single power-up control circuit 305. Therefore, the discussion of the single daughter circuit 315 and the single mother circuit 320 should not be construed as being limiting to either the scope or the spirit of the present invention.

The power-up control circuit 305 can also include a voltage generation circuit 325 and a voltage recovery circuit 330. The voltage generation circuit 325 can be coupled to both the daughter circuit 315 and the voltage recovery circuit 330 and can be controlled by a sleep control signal line. The voltage generation circuit 325 can provide a voltage level that can be useful in controlling the turn-on of the mother circuit 320. The voltage recovery circuit 330, which can be coupled to the voltage generation circuit 325 and to the mother circuit 320, can be used to help reduce leakage current once the multi-voltage threshold design block 310 has been fully turned on.

With reference now to FIG. 3b, there is shown a diagram illustrating a view of a portion of an integrated circuit 300, wherein the integrated circuit 300 includes a power-up control circuit 305 arranged in a footer configuration, according to a preferred embodiment of the present invention. The daughter circuit 315, which can serve to create a current path from the Vdd power rail through the multi-voltage threshold design block 310 to the Vss power rail, can be implemented using a transistor 355, preferably an N-type MOS transistor. The transistor's drain terminal can be coupled to the multi-voltage threshold design block 310, while its source terminal can be coupled to the Vss power rail. As discussed above, the daughter circuit 315 can be used to provide an initial coupling of the multi-voltage threshold design block 310 to the Vss power rail, and the sizing of the transistor 355 can be dependant on performance requirements, such as an electron migration performance requirement. Although shown in FIG. 3b as a single transistor, depending on the sizing requirements and manufacturing process restrictions, the daughter circuit 315 can be implemented using more than one transistor arranged in a parallel configuration.

The mother circuit 320 can also be implemented using a transistor. However, since a function of the mother circuit 320 is to provide a large current, a large transistor is needed. A typical implementation of the mother circuit 320 would be to use more than one transistor, such as transistors 360 (preferably N-type MOS transistors), arranged in a parallel configuration, with drain terminals coupled to the multi-voltage threshold design block 310 and source terminals coupled to the Vss power rail. Although shown in FIG. 3b as being formed from a multitude of transistors, any number of transistors (one or more) can be used to implement the mother circuit 320, as long as the performance requirements and process technology limitations are met.

Since the power-up control circuit 305 lies between the multi-voltage threshold design block 310 and the Vss power rail, the voltage potential at a node between the multi-voltage threshold design block 310 and the power-up control circuit 305 is not truly equal to Vss. The node can be referred to as virtual Vss ($V_{Vss}$). Rather, the voltage potential between the multi-voltage threshold design block 310 and the power-up control circuit 305 when current is flowing is approximately equal to Vss plus a voltage drop across the transistor 355 (the daughter circuit 315) and the transistors 360 (the mother circuit 320).

The voltage generation circuit 325 can include an inverter 365, which can be used mainly to maintain a proper polarity to the sleep control signal (SLEEPIN), and a transistor 367. According to a preferred embodiment of the present invention, the transistor 367 is a P-type MOS transistor and can be arranged in a diode connected configuration, with a gate terminal being coupled to a source terminal that is also coupled to $V_{Vss}$. Alternatively, a diode can be used in place of the transistor 367. Rather than having a lower power supply of the inverter 365 being directly coupled to Vss, it is connected to a drain terminal of the transistor 367. Connected in such a configuration, a minimum output voltage of the inverter 365 (in response to a maximum input voltage) is approximately equal to $V_{Vss}$.

The voltage recovery circuit 330 includes an inverter 370, again, mainly used to maintain a proper polarity to the sleep control signal (SLEEPIN), and two transistors. A first transistor 372 (preferably an N-type MOS transistor) that can be arranged in a diode connected configuration and a second transistor 374 (also preferably an N-type MOS transistor). Alternatively, a diode can be used in place of the first transistor 372 and the second transistor 374. Also, a combination of N-type MOS and P-type MOS transistors can be used. According to a preferred embodiment of the present invention, the first transistor 372 can have its drain and gate terminals coupled to an output of the inverter 370, while its source terminal can be coupled to a gate terminal of the second transistor 374. A drain terminal of the second transistor 374 can be coupled to the drain terminal of the transistor 367 and a source terminal of the second transistor 374 can be coupled to Vss.

When power path is shut-off and current is not flowing, the voltage potential at $V_{Vss}$ can be up and close to the voltage potential at the Vdd power rail, which can be substantially different from the voltage potential at the Vss power rail. Therefore, if the current path created by the power-up control circuit 305 permits too great of a current flow, then substantial glitches can occur. The power-up control circuit 305 can help to alleviate the glitches via a two-stage power-up sequence through the use of the daughter circuit 315 and the mother circuit 320.

Upon receiving an active sleep control signal (SLEEPIN) on the sleep control signal line, the transistor 355 (the daughter circuit 315) turns on and couples the multi-voltage threshold design block 310 to the Vss power rail. However, since the transistor 355 is small, the amount of current is small. With the transistor 355 on, the voltage potential of $V_{Vss}$ discharges from being close to Vdd to being close to Vss.

According to a preferred embodiment of the present invention, the output of the voltage generation circuit 325, which can be expressed as $V_{Vss}$+Vt, wherein Vt is the threshold voltage of the transistor 367. The value of Vt can depend on the process technology used. For example, in a typical 65 nanometer process, Vt can be about 200 mV, while in a 65 nanometer low power process Vt can be about 400 mV. However, since transistor 355 is turned on, the voltage potential of $V_{Vss}$ is discharging towards zero (0). Although $V_{Vss}$ never becomes zero (0) due to the voltage drop across the transistor 355, the connection of the lower power supply of the inverter 365 to the drain terminal of the transistor 367 results in the inverter 365 producing an output level approximately equal to Vt (a logic low) in response to its input being at a logic high.

With the output of the voltage generation circuit 325 being approximately equal to Vt (a logic low), the output of the voltage recovery circuit 330 (an output of the inverter 370) will naturally rise to a logic high level. As the output of the voltage recovery circuit 330 increases, it will eventually exceed a threshold voltage for the transistors 360 (for example, depending on process technology, either 200 mV or 400 mV) of the mother circuit 320, turning on the transistors 360. Since the potential of $V_{Vss}$ is now much closer to Vss than Vdd, any glitch that is produced by the turning on of the transistors 360 will be much smaller in magnitude. As the output of the voltage recovery circuit 330 continues to rise towards the logic high level, the voltage potential can increase to a point that is greater than a sum of the threshold voltages of the first transistor 372 and the second transistor 374. Once the output of the voltage recovery circuit 330 exceeds the sum of the threshold voltages, the second transistor 374 will be turned on and will pull down the voltage generation circuit 325 to Vss, which will help to reduce leakage current.

Figure 4:
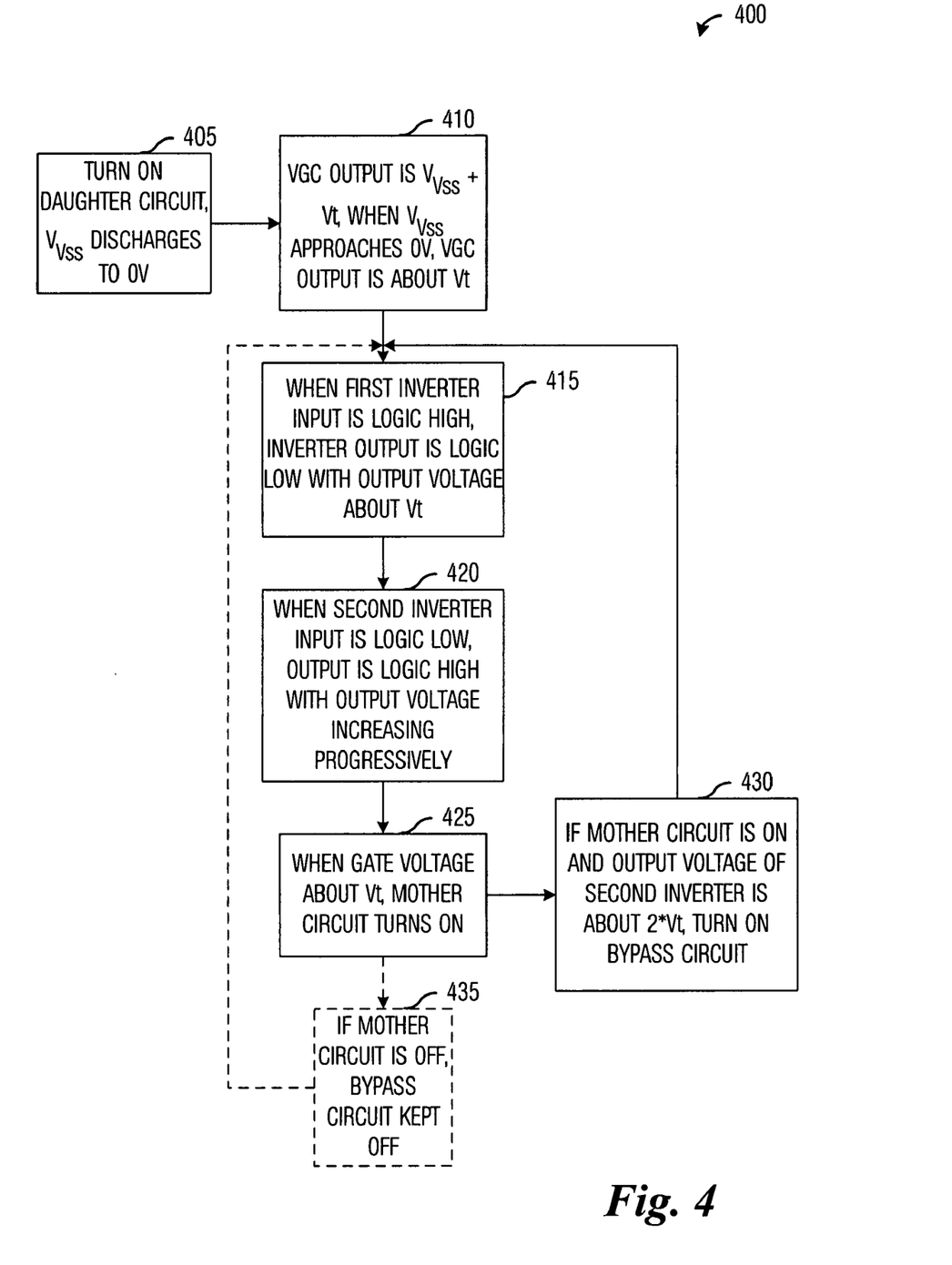
FIG. 4 is a flow diagram of a sequence of events in the operation of a power-up control circuit, according to a preferred embodiment of the present invention.

With reference now to FIG. 4, there is shown a flow diagram illustrating a sequence of events 400 in the operation of the power-up control circuit 305, wherein the power-up control circuit 305 is arranged in a footer configuration, according to a preferred embodiment of the present invention. The sequence of events 400 illustrates the operation of the power-up control circuit 305 when arranged in a footer configuration. A similar sequence of events can be used to describe the operation of the power-up control circuit 305 when it is arranged in a header configuration. Therefore, the discussion of the power-up control circuit 305 in a footer configuration should not be construed as being limiting to either the scope or the spirit of the present invention.

An initial event in the sequence of events 400 can be the reception of a signal on a sleep control signal line to signify the turn-on of a multi-voltage threshold design block 310 connected to the power-on control circuit 305. When such a signal is received, the daughter circuit 315 can be turned (block 405), which, for an integrated circuit with the power-up control circuit 305 arranged in a footer configuration, means that the voltage potential at node $V_{Vss}$ will discharge to zero (0). The output of the voltage generation circuit 325, as discussed previously, can be expressed as $V_{Vss}$+Vt, therefore, as $V_{Vss}$ approaches zero (0), the output of the voltage generation circuit 325 approaches Vt (block 410).

Logically speaking, the input to inverter 365 is a logic high, which will make the output of the inverter 365 a logic low with an output voltage at about Vt (block 415). Since the input to the inverter 370 is a logic low (output of the inverter 365), the output of the inverter 370 is a logic high (block 420). As the output of the inverter 370 increases to the logic high level, when the output is approximately equal to Vt of the transistors in the mother circuit 320, the transistors (the mother circuit 320) turns on (block 425).

The output of the inverter 370 will continue to increase pass Vt and when the output is approximately equal to 2*Vt, a bypass circuit (transistor 374) will turn on to reduce leakage current (block 430). However, while the output of the inverter 370 is increasing but has not yet exceeded Vt, the bypass circuit is kept off (block 435).

Figure 5:
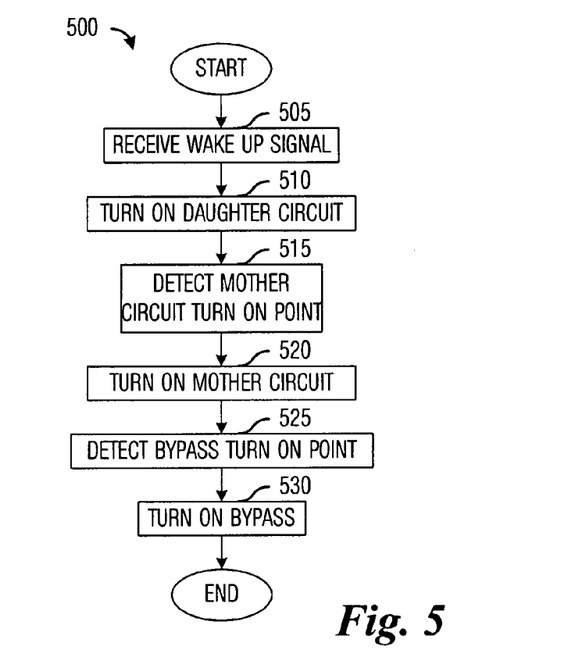
FIG. 5 is a flow diagram of a high-level view of a sequence of events in the operation of a power-up control circuit in an integrated circuit, according to a preferred embodiment of the present invention.

With reference now to FIG. 5, there is shown a diagram illustrating a high-level view of a sequence of events 500 in the operation of a power-up control circuit in an integrated circuit, wherein the power-up control circuit is used to control current flowing through power domains in the integrated circuit, according to a preferred embodiment of the present invention. The sequence of events 500 can begin with the receipt of a wake up signal (block 505). With the receipt of the wake up signal, a daughter circuit in the power-up control circuit can be turned on to create a current path (block 510). According to a preferred embodiment of the present invention, the daughter circuit can be implemented as a small transistor to limit the amount of current flowing through the current path.

A corresponding mother circuit can be turned on after the daughter circuit is turned on to enable an adequate flow of current to power the circuitry in the power domain. However, the mother circuit is not turned on immediately after the daughter circuit is turned on, since such a rapid turn on can result in significant glitches. Therefore, it is preferred that a specified voltage level on a signal line rise to a specified threshold (block 515) before the mother circuit is turned on (block 520). The waiting for the voltage level to rise to the specified threshold can reduce an elapsed time between the turn on of the daughter circuit and the mother circuit when compared to waiting a fixed period of time, since it is possible for the mother circuit to be safely turned on prior to the expiration of the fixed period of time.

Once the mother circuit is turned on (block 520) and the current to the circuitry in the power domain is provided as needed, then to help reduce leakage current, it can be necessary to turn on a bypass circuit. The bypass circuit can be turned on when a voltage level resizes to a second specified threshold (block 525). When the voltage level reaches the second specified threshold, then the bypass circuit is turned on (block 530) to reduce leakage.

With reference now back to FIG. 3c, there is shown a diagram illustrating a view of a portion of an integrated circuit 300, wherein the integrated circuit 300 includes a power-up control circuit 305 arranged in a header configuration, according to a preferred embodiment of the present invention. The power-up control circuit 305 arranged in a header configuration retains the same basic circuit blocks as the power-up control circuit 305 arranged in a footer configuration (as shown in FIG. 3b). The power-up control circuit 305 includes the daughter circuit 315 that includes a transistor 385. However, in the header configuration, the transistor 385 is preferably a P-type MOS transistor with the transistor's source terminal being coupled to the multi-voltage threshold design block 310 and its drain terminal being coupled to the Vdd power rail. Similarly, the mother circuit 320 can include a plurality of transistors 390, each being preferably a P-type MOS transistor, arranged in a parallel configuration, with each transistor's source terminal being coupled to the multi-voltage threshold design block 310 and each drain terminal being coupled to the Vdd power rail. As with the power-up control circuit 305 arranged in a footer configuration, the number of transistors 385 and transistors 390 can depend on factors such as performance requirements and manufacturing process restrictions.

Since the power-up control circuit 305 lies between the multi-voltage threshold design block 310 and the Vdd power rail, the voltage potential at a node between the multi-voltage threshold design block 310 and the power-up control circuit 305 is not truly equal to Vdd. The node can be referred to as virtual Vdd ($V_{Vdd}$). Rather, the voltage potential between the multi-voltage threshold design block 310 and the power-up control circuit 305 when current is flowing is approximately equal to Vdd minus a voltage drop across the transistor 385 (the daughter circuit 315) and the transistors 390 (the mother circuit 320).

The voltage generation circuit 325 can include an inverter 392, which can be used mainly to maintain a proper polarity to the sleep control signal (NSLEEPIN), and a transistor 394. According to a preferred embodiment of the present invention, the transistor 394 is an N-type MOS transistor and can be arranged in a diode connected configuration, with a gate terminal being coupled to a drain terminal that is also coupled to $V_{Vdd}$. Rather than having an upper power supply of the inverter 392 being directly coupled to Vdd, it is connected to a source terminal of the transistor 394. Connected in such a configuration, a maximum output voltage of the inverter 392 (in response to a minimum input voltage) is approximately equal to $V_{Vdd}$.

The voltage recovery circuit 330 includes an inverter 395, again, mainly used to maintain a proper polarity to the sleep control signal (NSLEEPIN), and two transistors. A first transistor 397 (preferably a P-type MOS transistor) that can be arranged in a diode connected configuration and a second transistor 399 (also preferably a P-type MOS transistor). According to a preferred embodiment of the present invention, the first transistor 397 can have its source and gate terminals coupled to an output of the inverter 395, while its drain terminal can be coupled to a gate terminal of the second transistor 399. A source terminal of the second transistor 399 can be coupled to the source terminal of the transistor 394 and a drain terminal of the second transistor 399 can be coupled to Vdd.

When power path is shut-off and current is not flowing, the voltage potential at $V_{Vdd}$ can be down and close to the voltage potential at the Vss power rail, which can be substantially different from the voltage potential at the Vdd power rail. Therefore, if the current path created by the power-up control circuit 305 permits too great of a current flow, then substantial glitches can occur. The power-up control circuit 305 can help to alleviate the glitches via a two-stage power-up sequence through the use of the daughter circuit 315 and the mother circuit 320.

Upon receiving an active sleep control signal (NSLEEPIN) on the sleep control signal line, the transistor 385 (the daughter circuit 315) turns on and couples the multi-voltage threshold design block 310 to the Vdd power rail. However, since the transistor 385 is small, the amount of current is small. With the transistor 385 on, the voltage potential of $V_{Vdd}$ charges from being close to Vss to being close to Vdd.

According to a preferred embodiment of the present invention, the output of the voltage generation circuit 325, which can be expressed as $V_{Vdd}$–Vt, wherein Vt is the threshold voltage of the transistor 394. The value of Vt can depend on the process technology used. For example, in a typical 65 nanometer process, Vt can be about 200 mV, while in a 65 nanometer low power process Vt can be about 400 mV. However, since transistor 385 is turned on, the voltage potential of $V_{Vdd}$ is charging towards Vdd. Although $V_{Vdd}$ never becomes Vdd due to the voltage drop across the transistor 385, the connection of the upper power supply of the inverter 392 to the source terminal of the transistor 394 results in the inverter 392 producing an output level approximately equal to Vdd–Vt (a logic high) in response to its input being at a logic low.

With the output of the voltage generation circuit 325 being approximately equal to Vdd–Vt (a logic high), the output of the voltage recovery circuit 330 (an output of the inverter 395) will naturally decrease to a logic low level. As the output of the voltage recovery circuit 330 decreases, it will eventually drop below a threshold voltage (actually, Vdd–Vt) for the transistors 390 of the mother circuit 320, turning on the transistors 390. Since the potential of $V_{Vdd}$ is now much closer to Vdd than Vss, any glitch that is produced by the turning on of the transistors 390 will be much smaller in magnitude. As the output of the voltage recovery circuit 330 continues to drop towards the logic low level, the voltage potential can decrease to a point that is less than Vdd—a sum of the threshold voltages of the first transistor 397 and the second transistor 399. Once the output of the voltage recovery circuit 330 drops below Vdd—the sum of the threshold voltages, the second transistor 399 will turn on and will pull up the voltage generation circuit 325 to Vdd, which will help to reduce leakage current.

Figure 6:
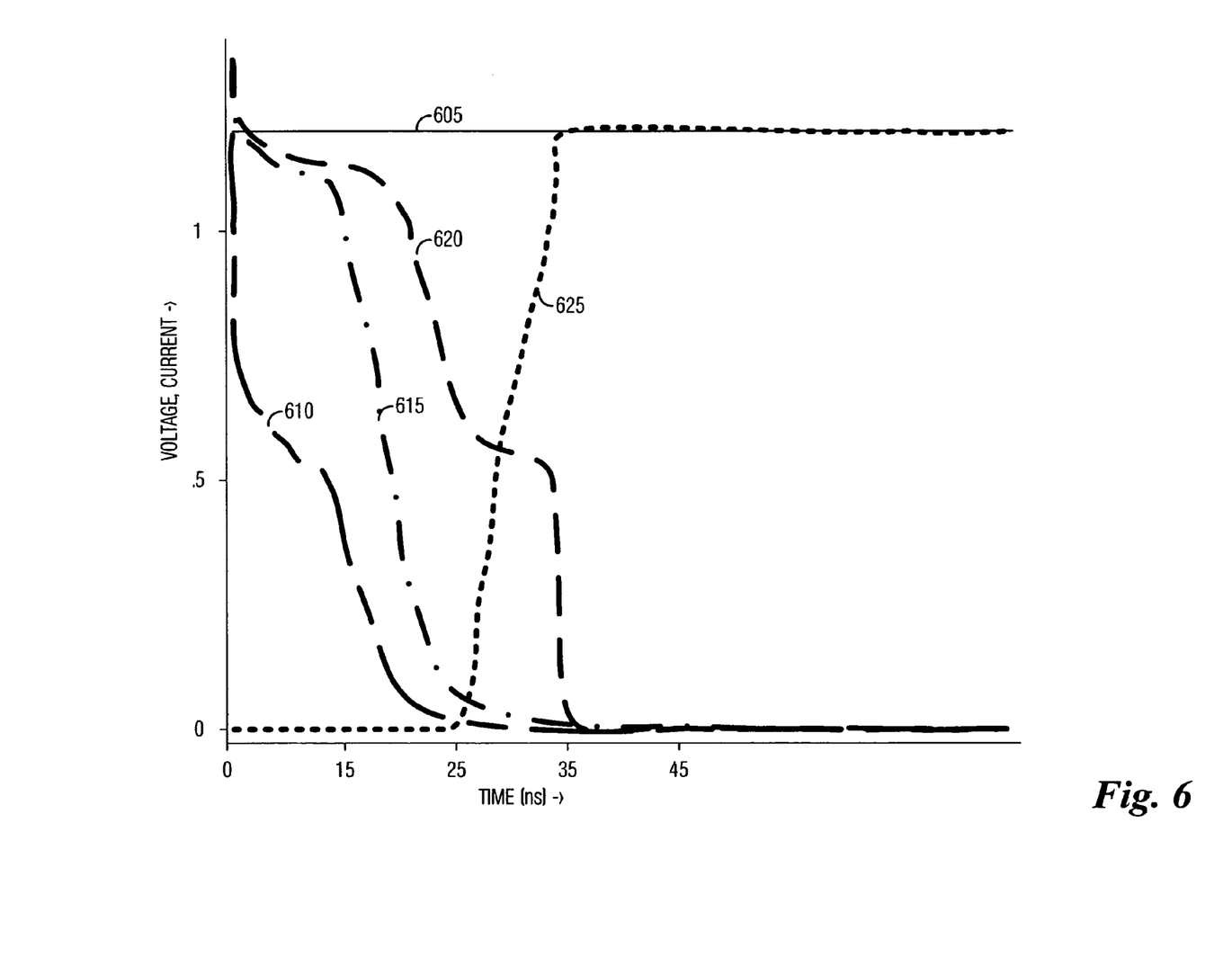
FIG. 6 is a data plot of voltage and current versus time at several nodes in a power-up control circuit arranged in a footer configuration, according to a preferred embodiment of the present invention.

With reference now to FIG. 6, there is shown a data plot illustrating voltage and current level versus time at several nodes in a power-up control circuit arranged in a footer configuration, such as the power-up control circuit 305 displayed in FIG. 3b, according to a preferred embodiment of the present invention. A first curve 605 displays the sleep control signal (SLEEPIN) at the input to the inverter 365. A second curve 610 displays the voltage potential at node $V_{Vss}$, while a third curve 615 displays current from the Vss power rail. A fourth curve 620 displays the voltage potential at the output of the voltage generation circuit 325 (the inverter 365) and a fifth curve 625 displays the voltage potential at the output of the voltage recovery circuit 330 (the inverter 370). The behavior of the fifth curve 625 shows that the output of the voltage recovery circuit 330, which can be used to turn on the mother circuit 320 does not begin to rise until the voltage potential at node $V_{Vss}$ (shown as the second curve 610) is almost at zero volts, meaning that if the mother circuit 320 was to immediately turn on, the glitch would be minimal.

Figure 7A:
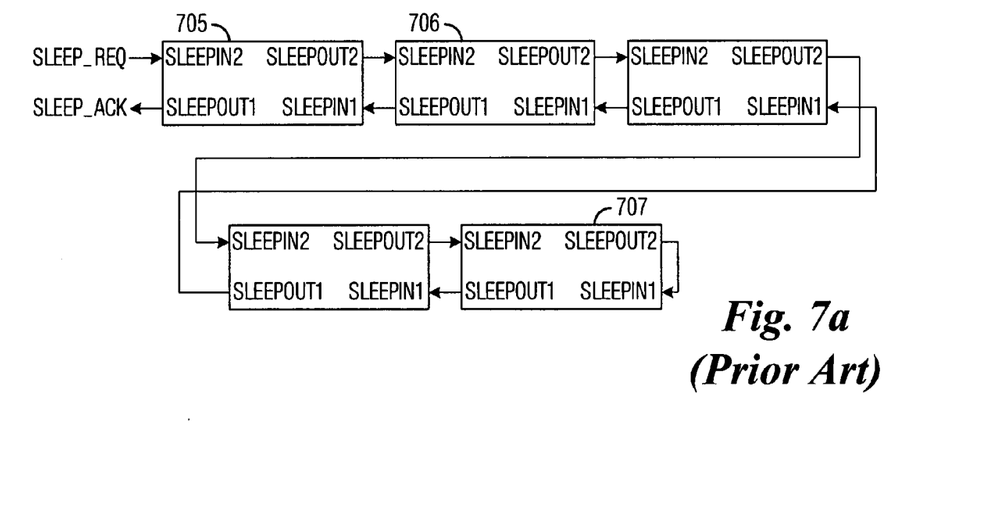
FIGS. 7a through 7c are diagrams of exemplary power-up control circuit arrangements for power domains in integrated circuits, according to a preferred embodiment of the present invention.
Figure 7B:
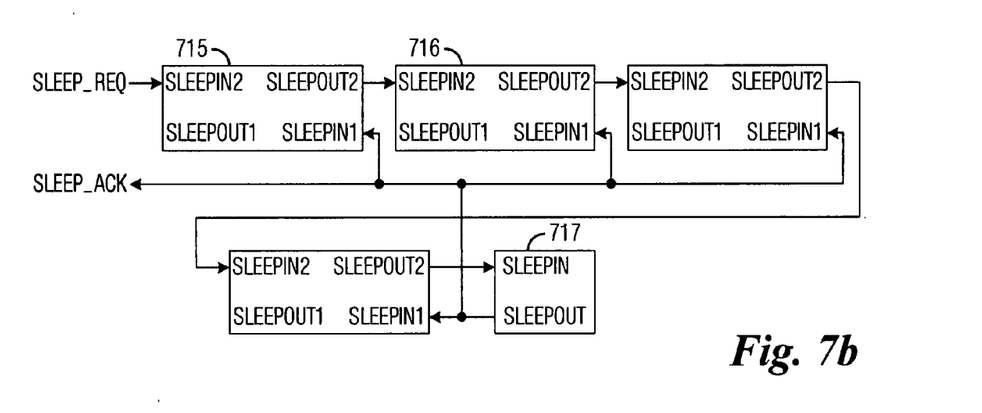
Figure 7C:
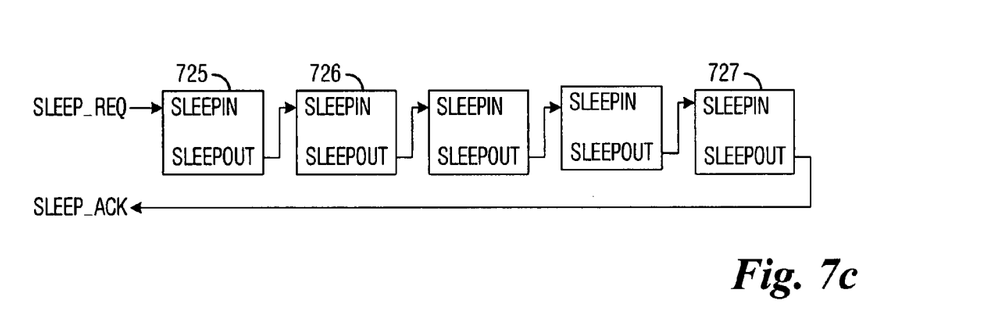

With reference now to FIGS. 7a through 7c, there are shown diagrams illustrating exemplary power-up control circuit arrangements for power domains in an integrated circuit, according to a preferred embodiment of the present invention. The exemplary power-up control circuit arrangements may be used to provide power to separate multi-voltage threshold design blocks, such as those in SRAM memories or other types of integrated circuits. The diagram shown in FIG. 7a illustrates prior art arrangement for power-up control circuits in a power domain and includes a sequential sequence of power-up control circuits, such as power-up control circuit 705 and 706. A power-up control circuit 707 is arranged at the end of the sequence. The arrangement makes use of prior art power-up control circuits, such as shown in FIG. 2. A sleep control signal (SLEEP_REQ) is provided to a second sleep control signal input of a first power-up control circuit (the power-up control circuit 705), which in turn is provided to a second power-up control circuit (the power-up control circuit 706). This continues until the power-up control circuit 707, wherein the sleep control signal is fedback to a first sleep control signal input of the power-up control circuit 707. The sleep control signal is then fedback through the sequence of power-up control circuits.

A request to wake up the circuitry in the power domain then must percolate through each power-up control circuit, first switching on a daughter circuit of each power-up control circuit in the sequence and then switching on a mother circuit of each power-up control circuit. This prior art technique has a disadvantage of not having a predictable time period between the switching on of an individual power-up control circuit's daughter circuit and its mother circuit. For example, there can be a maximum delay between the switching on of the daughter circuit the mother circuit of the power-up control circuit 705, while there is a minimum delay between the switching on of the daughter circuit and the mother circuit of the power-up control circuit 707.

The diagram shown in FIG. 7b illustrates an exemplary arrangement for power-up control circuits in a power domain. The arrangement includes a sequential sequence of power-up control circuits, such as power-up control circuit 715 and 716. The arrangement makes use of prior art power-up control circuits, such as shown in FIG. 2. However, a power-up control circuit 717 located at the end of the sequence can be configured as the power-up control circuit 305 shown in FIGS. 3a through 3c. A sleep control signal (SLEEP_REQ) is provided to a second sleep control signal input of a first power-up control circuit (the power-up control circuit 715), which in turn is provided to a second power-up control circuit (the power-up control circuit 716). This continues until the power-up control circuit 717, where the sleep control signal is fed back to every power-up control circuit.

A request to wake up the circuitry in the power domain then must percolate through each power-up control circuit, first switching on a daughter circuit of each power-up control circuit in the sequence. However, since the power-up control circuit 717 does not turn on its mother circuit until it is safe to do so, all of the mother circuits can be turned on since the delay between switching on the daughter circuit and the mother circuit of the power-up control circuit 717 is the minimum delay.

The diagram shown in FIG. 7c illustrates an exemplary arrangement for power-up control circuits in a power domain. The arrangement includes a sequential sequence of power-up control circuits, such as power-up control circuit 725 and 726. A power-up control circuit 727 is arranged at the end of the sequence. The power-up control circuits can be configured as the power-up control circuit 305 shown in FIGS. 3a through 3c. A sleep control signal (SLEEP_REQ) is provided to a sleep control signal input of a first power-up control circuit (the power-up control circuit 725). However, the sleep control signal does not get provided to a second power-up control circuit (the power-up control circuit 726) until both the daughter circuit and the mother circuit of the power-up control circuit 725 has been switched on. This is continued throughout the entire sequence.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An integrated circuit comprising:
   a daughter circuit coupled to a circuit block, the daughter circuit configured to couple the circuit block to a power rail in response to a control signal;
   a first control circuit coupled to the daughter circuit, the first control circuit configured to produce a signal at a specified voltage level responsive to the control signal;
   a second control circuit coupled to the first control circuit, the second control circuit configured to detect when the signal produced by the first control circuit reaches a specified threshold and to produce a turn on signal; and
   a mother circuit coupled to the circuit block and to the second control circuit, the mother circuit configured to couple the circuit block to the power rail responsive to the turn on signal.

2. The integrated circuit of claim 1, wherein the second control circuit further comprises a bypass circuit coupled to the first control circuit, the bypass circuit configured to shunt the first control circuit to the power rail in response to a detecting that a signal produced by the second control signal reaches a second specified threshold.

3. The integrated circuit of claim 2, wherein the bypass circuit comprises:
   a first transistor with a first terminal coupled to the first control circuit, a second terminal coupled to the power rail; and
   a second transistor with a first terminal coupled to an output of the second control circuit and a second terminal coupled to a control terminal of the first transistor, and a control terminal coupled to the first terminal.

4. The integrated circuit of claim 3, wherein the first transistor and the second transistor are selected from the group consisting of: N-type MOS transistors, P-type MOS transistors, and combinations thereof.

5. The integrated circuit of claim 3, wherein the second specified threshold is about equal to a sum of the threshold voltages of the first transistor and the second transistor.

6. The integrated circuit of claim 1, wherein the daughter circuit comprises a first switch, and wherein the mother circuit comprises a second switch.

7. The integrated circuit of claim 6, wherein the first switch and the second switch are selected from the group consisting of: N-type MOS transistors, P-type MOS transistors, and combinations thereof.

8. The integrated circuit of claim 7, wherein the transistor used in the mother circuit is larger than the transistor used in the daughter circuit.

9. The integrated circuit of claim 7, wherein the mother circuit turns on when the voltage potential of the turn on signal exceeds a threshold voltage of the transistor used as the mother switch.

10. The integrated circuit of claim 1, wherein the first control circuit comprises:
    a voltage generation device having an input coupled to the control signal and an output coupled to the second control circuit, the voltage generation device configured to produce the signal at the specified voltage level responsive to the control signal; and
    a diode coupled to the voltage generation device and to the power rail.

11. The integrated circuit of claim 10, wherein the voltage generation device comprises a P-type MOS transistor, an N-type MOS transistor, a diode, or combinations thereof.

12. The integrated circuit of claim 10, wherein the signal produced by the first control circuit is expressible as VVpower_rail+Vt, where VVpower_rail is a voltage potential at a node between the first control circuit and the circuit block with Vpower_rail being the voltage potential of the power rail and Vt is a threshold voltage of a transistor used as the diode.

13. A method for power-up control of a functional circuit, the method comprising:
    turning on a first circuit in response to a receiving of a power-up signal, wherein the first circuit regulates a first current flow to the functional circuit;
    turning on a second circuit in response to a detecting that a voltage potential based on a signal line produced by a voltage generation circuit is about equal to a turn on point for the second circuit, wherein the second circuit regulates a second current flow to the functional circuit; and
    turning on a bypass circuit in response to a detecting that a voltage potential based on the signal line produced by the voltage generation circuit is about equal to a turn on point for the bypass circuit, the turn on point for the second circuit and the turn on point for the bypass circuit being different.

14. The method of claim 13, wherein the second current is less than the first current.

15. The method of claim 13, wherein the second circuit comprises one or more transistors arranged in parallel, and wherein the turn on point for the second circuit is the threshold voltage of transistors used in the second circuit.

16. The method of claim 13, wherein the bypass circuit comprises a pair of serially connected transistors, and wherein the turn on point for the bypass circuit is a sum of the threshold voltages of the transistors used in the bypass circuit.

17. An integrated circuit comprising one or more power domains, at least one power domain comprising:
    one or more circuit blocks, with each circuit block coupled to a first power rail, each circuit block configured to perform a specified function;
    a power-up control circuit for each circuit block, the power-up control circuit coupled between the circuit block and a second power rail, the power-up control circuit configured to regulate current flowing between the first power rail and the second power rail through the power-up control circuit and a respective circuit block, the power-up control circuit comprising, a daughter circuit coupled to a respective circuit block, the daughter circuit configured to detect a specified value on a control signal line and couple the respective circuit block to the second power rail when the specified value is detected on the control signal line;

a first control circuit coupled to the daughter circuit, the first control circuit configured to produce a signal at a specified voltage level responsive to a control signal on the control signal line;

a second control circuit coupled to the first control circuit, the second control circuit configured to detect when the signal produced by the first control circuit reaches a specified threshold and to produce a turn on signal; and a mother circuit coupled to the respective circuit block and to the second control circuit, the mother circuit configured to couple the respective circuit block to the second power rail responsive to the turn on signal.

18. The integrated circuit of claim 17, wherein each power-up control circuit has a control signal input and a control signal output, and wherein a plurality of power-up control circuits are arranged in a sequential sequence connected by a control signal line entering the power-up control circuit at the control signal input and exiting the power-up control circuit at the control signal output, with each control signal line conducting the control signal.

19. The integrated circuit of claim 17, wherein there are multiple power domains comprising power-up control circuits, and wherein each power domain is responsive to an independent control signal.

20. The integrated circuit of claim 17, wherein the integrated circuit comprises a static random access memory (SRAM).

* * * * *